(12) United States Patent
Guerin et al.

(10) Patent No.: US 6,380,843 B1
(45) Date of Patent: Apr. 30, 2002

(54) SECURED ACCESS CHECKING SYSTEM ENABLING THE AUTOMATIC TRANSFER OF ENTITLEMENT TO PRODUCE KEYS

(75) Inventors: Didier Guerin, Caen; Constant Hardy, Clamart; Marc Girault, Caen; Marie-Josèphe Revillet, Verson, all of (FR)

(73) Assignee: La Poste, Boulogne (FR)

( * ) Notice: Subject to any disclaimer, the term of this patent is extended or adjusted under 35 U.S.C. 154(b) by 0 days.

(21) Appl. No.: 09/171,212

(22) PCT Filed: Apr. 15, 1997

(86) PCT No.: PCT/FR97/00677

§ 371 Date: May 13, 1999

§ 102(e) Date: May 13, 1999

(87) PCT Pub. No.: WO97/40474

PCT Pub. Date: Oct. 30, 1997

(30) Foreign Application Priority Data

Apr. 19, 1996 (FR) .......................... 96 04963
Jun. 28, 1996 (FR) .......................... 96 08049

(51) Int. Cl.$^7$ ................................ H04Q 1/00
(52) U.S. Cl. .................................. 340/5.25
(58) Field of Search ............ 340/875.31, 825.69, 340/825.72, 825.32, 5.54, 5.22, 5.2; 70/278; 235/382.5, 382

(56) References Cited

U.S. PATENT DOCUMENTS 3,906,447 A * 9/1975 Crafton ............... 340/825.31
4,988,987 A * 1/1991 Barrett et al. ......... 340/825.31
5,397,884 A * 3/1995 Saliga .................... 235/382.5

FOREIGN PATENT DOCUMENTS

FR 2531128 2/1984
FR 2597142 10/1987
FR WO 96/02899 2/1996

* cited by examiner

Primary Examiner—Brian Zimmerman
(74) Attorney, Agent, or Firm—Nilles & Nilles, S.C.

(57) ABSTRACT

A secured system of access checking using a portable storage carrier (C) on which there is recorded an electronic key (CL), a digital data processing instrument (LE) for the production of keys, and an electronic lock (L) function capable of authorizing access should the storage carrier have the requisite electronic key. To transfer an entitlement to produce keys (CL) from one production digital data processing instrument (LE) to another, it is loaded with a new public key (K') and the signature (CER') of this key.

7 Claims, 1 Drawing Sheet

SECURED ACCESS CHECKING SYSTEM ENABLING THE AUTOMATIC TRANSFER OF ENTITLEMENT TO PRODUCE KEYS

BACKGROUND OF THE INVENTION

1. Field of the Invention

The present invention relates to a secured system of access checking that enables the automatic transfer of entitlement to produce keys.

The invention can be applied especially in the field of the checking of access to buildings, computer systems or any kind of object for which the opening or use has to be checked.

2. Description of the Related Art

There is the known patent application PCT/FR95/00935 published under number WO96/029899, for an access checking system limited to authorized and renewable time slots.

This system relies on the use of portable storage carriers such as flush-contact or contact-free chip cards (integrated circuit cards), magnetic cards, badges and electronic keys with or without contact. These carriers are distributed to all users to whom access is to be authorized.

For this purpose, the magnetic carriers have a memorized electronic key giving a right of access.

This key has a data element corresponding to an access authorization period and a digital signature of this data element. The period of use corresponds in practice to a date of use and to a time slot of use so much so that the key is valid only for one day and for the defined time slot.

These keys have a short lifetime and are especially well suited to applications such as the distribution and collection of mail by a postman. The user of such a carrier must recharge his carrier with a new valid key every day.

The problem of the theft and loss of an information carrier comprising a key of this kind no longer arises since the lifetime of the logic key is ephemeral.

Anyone who has found or stolen the carrier will no longer be able to use it the next day. Consequently, it is no longer even necessary to keep a black list of all the carriers that have been stolen or lost.

This access checking system is highly efficient in applications where no permanent access right or very long-term access right has to be provided. However, if this is not the case, the system proves to be unsuitable.

Earlier checking systems propose the keeping of a black list for stolen or lost carriers in order to prevent the unauthorized persons who hold such carriers from accessing the protected unit.

The maintaining of such lists requires action on electronic locks. For it is necessary to make recordings, on these locks, of the identification numbers of the carriers that are stolen or lost after their holder has reported their loss. Such action is a source of constraint.

Should a person who is entitled to produce electronic keys and record them on the storage carriers have his entitlement withdrawn (in the case of right of access to a building, this could be for example because of a change in the managing agent or manager of the building), the transfer of entitlement to another person makes it necessary to provide all users who had access rights with new carriers on which the electronic keys are computed with the key-producing means possessing the new entitlement.

This is a constraint that leads to substantial costs.

OBJECTS AND SUMMARY OF THE INVENTION

The secured access checking system according to the invention can be used to resolve this problem. The carriers delivered remain always valid even in the event of a transfer of entitlement to another person or more specifically to another key-producing means.

An object of the invention more particularly is a system of access checking by means of a portable storage carrier C on which there is recorded an electronic key CL, comprising means LE for the production of the electronic keys and a means fulfilling an electronic lock L function capable of authorizing access should the storage carrier contain the requisite electronic key, according to which the production means comprise a information element HA for entitlement to produce the keys CL, including a public key K, and the digital signature CER of this information element; and in which a transfer of entitlement to new production means is made by the recording of a new public key K' and the corresponding signature CER'. This new public key is, after verification of the entitlement, recorded in the electronic lock L which verifies the keys CL produced by these means LE.

According to another particular feature, the data elements pertaining to the production means comprise an identification data element ID, a period of validity VAL and the public key K, the period of validity assigned to the former key K having an ending date that corresponds to the starting date of validity of the period of validity of the new key K', this ending date possibly being later than the starting date (for example later by one month).

Advantageously, for the verification of a new version of a key K' with a signature CER', the lock compares and replaces the ending date of the period of validity of the former key with the starting date of validity of the next key (the new key).

The public keys K and K' are obtained by the authority through a production function $F_{KA}$ with public key KA, using a secret key ka. The lock has, in memory, at the time of verification, a verification function $V_{KA}$ and the key KA for the verification of these signatures CER or CER'.

The lock verifies any new entitlement.

Thus, when a new production means is in service, this means is declared to the lock which will check the keys produced by this means.

For this purpose, the authority records the entitlement certificate in the lock and the key KA that it has used for the computation. The production means may itself record its entitlement in the lock.

Carriers for which the keys have been produced fraudulently using means that no longer possess entitlement do not permit access to the units protected.

Indeed, the transfer of entitlement is done by the secured loading of a new public key into the lock.

The previous public keys are in principle preserved unless the production algorithm has been broken or the secret key of the pair formed by the secret key and the public key has been discovered.

According to another characteristic, an electronic signature S is computed from an algorithm with a secret key k and from a corresponding public key K by production means LE, and the lock has, in memory, the public key K, a function $V_K$ for the verification of this signature S and a means to implement this verification function.

The electronic key CL recorded in a carrier has a data element identifying the user and a data element identifying the carrier. For example, the latter data element will be the serial number of manufacture of the carrier and the electronic signature of these data elements.

Other advantages and particular features of the invention shall appear from the following description given by way of a non-exhaustive indication with reference to the appended drawing of FIG. 1 which shows the diagram of a secured access checking system according to the object of the invention.

It is specified that the term "authority" is understood to mean an organization possessing secret keys, means capable of delivering public keys and entitlement data elements.

The term "secret key" is understood to mean a digital data element that is known only by a unit of the authority or of the production means.

The term "public key", KA, K, K', is understood to mean a digital data element shared among several users, the authority and the means of production of the electronic keys or the means of production and the electronic lock.

The term "key production means" LE is understood to mean a digital data processing machine, for example a microcomputer, possessing an entitlement information element HA and having computation means to obtain the digital data signal implementing functions such as an algorithm with a conventional public key.

The term "electronic key" or "logic key" CL is understood to mean one or more digital data elements accompanied by their digital signature giving right to access.

The invention is described by way of an example in its application to the management of access to buildings.

Reference may be made to the diagram of FIG. 1 for a clearer understanding.

The storage carriers C comprising the electronic keys distributed to authorized users could be either chip cards or chip keys or badges or magnetic cards. The transmission between the carrier C and the lock L may be done through electronic contacts or by radioelectric means or by the reading of a magnetic tape.

By way of an example, a chip card has been chosen as a carrier.

It has an input/output interface I/O 100 and an electrically recordable non-volatile memory 101.

In the example described, the customization of a carrier C consists especially of the recording in the memory of an identification information element IDA of the user A comprising for example, his name, the number of his apartment and the specific data element $D_pA$ that is assigned to him. In a preferred exemplary embodiment, this data element $D_pA$ is the date of customization of his storage carrier.

A recording is also made in the memory of an information element identifying the carrier. It is, for example, the serial number NS of manufacture of the carrier. In general, this information element is entered at the end of manufacture, before the carrier is handed over to the authority AT.

The customization of the carriers is done by the machine LE (and the person who uses it) possessing an entitlement HA (ID, KA, CER, K).

The production machine LE is for example formed by a PC type microcomputer provided with a card reader.

BRIEF DESCRIPTION OF THE DRAWINGS

The diagram of FIG. 1 gives a schematic view of the different functional blocks of this machine LE.

DESCRIPTION OF THE PREFERRED EMBODIMENT

Figure 1:
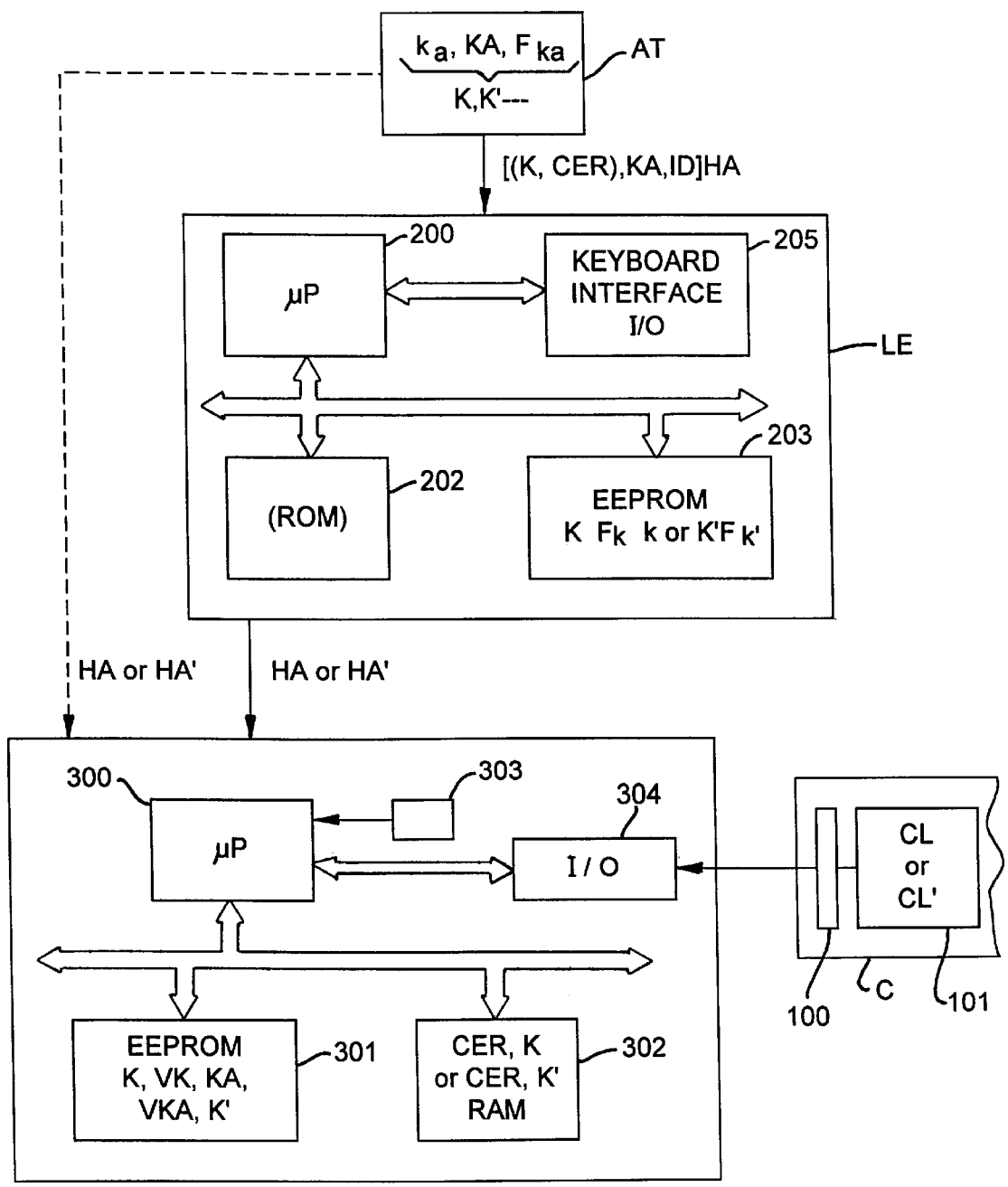

The production machine LE has a microprocessor type processing unit 200 connected by a bus 201 to memories. A RAM type volatile working memory 202 contains the data elements of the application.

An EEPROM type non-volatile memory has, in a protected zone, the secret key k used for the production of the electronic keys. It furthermore has the program for the production of electronic keys. This program implements a production algorithm of the type with public key $F_K$ using the secret key k and the corresponding public key K.

The memory 203 furthermore comprises the customization program which consists of the writing of the specific data element namely, according to the preferred embodiment, the date $D_pA$ of the day of customization (plus the time as the case may be). This information is obtained from an internal clock.

The specific data element may also be obtained by a counter whose value is increased (incremented by 1 for example) with each new version of a key.

The performance of these programs is launched by the entitled person by means of the keyboard 205.

According to another aspect of the invention, the volatile memory 203 may also contain the public key KA and the entitlement certificate CER.

Indeed, a production machine LE must be entitled to produce keys CL. The entitlement is taken back from it by the authority AT.

In practice, the authority gives it a public key K which will be used by it in the computation of the keys CL. This key K is transmitted with a period of validity comprising at least a starting date of validity. However, the key K is transmitted to it with a signature that is herein called the certificate CER.

This certificate CER is therefore the digital signature of a set of data elements including the identity of the entitled person ID, his public key K and the period of validity VAL such that:

$$CER = F_{KA}(ID, VAL, K),$$

where $F_{KA}$ is the public key algorithm, ka is the secret key for the computation of the certificate and KA is the corresponding public key. This computation is done by the authority AT.

The electronic locks CL are formed by a chip card reader or microcomputer type machine fitted out with a chip card reader interface for the exemplary embodiment described.

The lock L has a processing unit 300, an electrically programmable non-volatile memory 301 and a working memory 302. The memory 301 has a program for the verification of the keys implementing a function $V_K$ for the verification of the electronic keys CL.

This memory 301 also contains the public key K corresponding to the secret key k that has been used to produce the keys CL.

The lock L enables the detection of false electronic keys. For this purpose, the lock compares the date of customization $D_pA$ of the key CL with the date of customization that it has memorized for the same carrier (IDA identification).

If there is equality, the lock permits access. If the date $D_pA >$ the date of customization present in the lock, then it is a new version of key, and the lock updates its list of keys, namely it registers the new date of customization instead of the old one.

If the date $D_pA <$ the customization date present in the lock, then it is a re-utilization of a key that has been reported to be stolen or lost.

Access is prohibited. There is no updating of the list of keys.

When an entitlement HA is assigned, the pair consisting of the public key K and certificate CER of the key-production machine LE as well as the key KA are recorded by the authority in the lock in a working memory for example, to enable the lock to perform a verification of entitlement.

This verification is done at each new entitlement. For this purpose, the key contains also the program of verification of the certificate, this program implementing a function of verification $V_{KA}$ of the certificate. At the end of this verification, if the certificate truly corresponds to the public key K, the key is recorded in an EEPROM memory, and the certificate and the key KA are not preserved.

When a change in entitlement takes place, a certificate CER' for a new key K' is computed by the authority AT and loaded into the machine LE as illustrated by the diagram of FIG. 1.

Thus, according to the invention, this change in entitlement consists of the use of a new public key K' and of the assigning of this new key K' to the machine.

Electronic keys CL computed by the machine that had the former public key K will be always valid as also the new keys that are produced by a machine having the key K', provided that the lock has verified this new entitlement.

The period of validity assigned to the key K is chosen so that it has an ending date of validity equal to the starting date of the period of validity assigned to the key K' or a date that is slightly later (by one month for example).

Should a production machine LE have a data element on entitlement HA (ID, KA, CER, K), be it a first entitlement or a new entitlement, and should the keys produced CL (S, $D_pA$, IDA) have a specific data element such as the date of customization of the carrier on which they are recorded, the lock could verify the conditions of access stipulated in the first part of the description and furthermore compare the date $D_pA$ with the period of validity of the public key of the machine.

This comparison will make it possible, for example, to detect the keys CL that could have been produced when the production machine LE no longer had any entitlement.

Indeed, the customization dates $D_pA$ necessarily fall in one or the other of the periods of validity VAL or VAL' of the keys K or K'.

In each case, the lock could then compare the customization date with the corresponding period of validity of the corresponding public key. The lock authorizes access when, at the end of this verification, it finds that the date $D_pA$ is within the period of validity of the corresponding public key.

Since each public key K or K' has a period of validity that is proper to it, it is easy to detect fraud.

What is claimed is:

1. A system of access checking by means of a portable storage carrier (C) on which there is recorded an electronic key CL, comprising:

production means (LE) for production of the electronic key; and a means fulfilling an electronic lock (L) function for authorizing access should the storage carrier contain the requisite electronic key, characterized in that the production means (LE) comprises an information element (HA) for entitlement to produce the key CL, including a public key (K), and a digital signature CER of the public key, and characterized in that a transfer of entitlement to a new production means is made by recording a new public key K' and a corresponding signature CER', wherein an invalid key produced using the production means (LE) that no longer possesses entitlement is not permitted access to units protected by the means fulfilling the electronic lock (L) function.

2. The access checking system according to claim 1, characterized in that the information element (HA) comprises an identification data element (ID), a period of validity VAL and the public key K, and in that the period of validity assigned to the public key K has an ending date that corresponds to the starting date of the validity of a new period of validity of the new public key K'.

3. The access checking system according to claim 1 characterized in that, for the verification of new version of the new public key K' with the corresponding signature CER', the means fulfilling the electronic lock L function uses a verification function with the new public key K' and, furthermore, the means fulfilling the electronic lock L function compares an ending date of validity of a former key with a starting date of validity of a new key.

4. The access checking system according to claim 1, characterized in that the digital signature of the public key K is obtained by the an authority (AT) through a production function $F_{ka}$ with a public key KA, and the means fulfilling the electronic lock L function comprising, in memory, at the time of verification, a verification function $V_{ka}$ and the public key KA.

5. The access checking system according to claim 1, wherein the new production means is declared to the means fulfilling an electronic lock (L) function and the means fulfilling an electronic lock (L) function determines the validity of keys produced by the new production means.

6. The access checking system according to claim 1, wherein an entitlement certificate is recorded in the means fulfilling an electronic lock (L) function along with a key KA.

7. The access checking system according to claim 1, wherein keys produced using the public key (K) are permitted access until a production algorithm has been broken.

* * * * *